United States Patent [19]
Takagi et al.

[11] Patent Number: 5,174,168
[45] Date of Patent: Dec. 29, 1992

[54] FLEXIBLE ROBOT ARM

[75] Inventors: Hiroaki Takagi; Yozo Nishi, both of Kanagawa, Japan

[73] Assignee: Kabushiki Kaisha Komatsu Seisakusho, Tokyo, Japan

[21] Appl. No.: 465,243

[22] PCT Filed: Sep. 9, 1988

[86] PCT No.: PCT/JP88/00917

§ 371 Date: May 7, 1990

§ 102(e) Date: May 7, 1990

[87] PCT Pub. No.: WO89/02350

PCT Pub. Date: Mar. 23, 1989

[30] Foreign Application Priority Data

Sep. 9, 1987 [JP] Japan .................. 62-224179

[51] Int. Cl.⁵ .................. F16H 27/02; G05G 11/00
[52] U.S. Cl. .................. 74/89.21; 74/109; 74/422; 74/479; 901/21
[58] Field of Search ............ 74/89.21, 89.22, 109, 74/110, 422, 479, 500.5, 501.5 R, 89.2; 901/21

[56] References Cited

U.S. PATENT DOCUMENTS

| | | |
|---|---|---|
| 856,288 | 6/1907 | Osborne .................. 74/109 |
| 1,288,966 | 12/1918 | Nielsen .................. 74/109 X |
| 3,060,972 | 10/1962 | Sheldon .................. 138/120 |
| 3,190,286 | 6/1965 | Stokes .................. 128/6 |
| 3,438,423 | 2/1968 | Melull et al. .................. 74/89.2 X |
| 4,393,728 | 7/1983 | Larson et al. .................. 74/479 X |
| 4,489,826 | 12/1984 | Dubson .................. 198/812 |

FOREIGN PATENT DOCUMENTS

| | | |
|---|---|---|
| 0118699 | 12/1984 | European Pat. Off. . |
| 3308474 | 9/1984 | Fed. Rep. of Germany ........ 901/21 |
| 50-481 | 1/1975 | Japan . |
| 50-130068 | 10/1975 | Japan . |
| 59-21756 | 5/1984 | Japan . |
| 59-134687 | 8/1984 | Japan . |
| 1202852 | 1/1986 | U.S.S.R. .................. 901/21 |
| 1202853 | 1/1986 | U.S.S.R. .................. 901/21 |
| 1301701 | 4/1987 | U.S.S.R. .................. 901/21 |
| 2119894 | 11/1983 | United Kingdom . |
| 2171076 | 8/1986 | United Kingdom . |

Primary Examiner—Leslie A. Braun
Assistant Examiner—David W. Laub
Attorney, Agent, or Firm—Armstrong & Kubovcik

[57] ABSTRACT

This invention relates to a flexible robot arm comprising a plurality of disc-shaped elements arranged in a series so as to consist of a flexible arm, both surfaces of each of the elements being formed in convex having an arched opposed single curve so as to form contact surfaces, and a plurality of wire-like actuating devices for allowing the flexible arm to curve or bend in a desired direction. Teh flexible robot arm of this invention is directed to make motors for driving the actuating devices compact in size and light in weight and also a drive unit section compact in size and light in weight. The flexible robot arm includes two drive units each interconnected to the proximal ends of respective pairs of actuating devices (e.g. 3a and 3c, and 3b and 3d) disposed oppositely to each other on the diagonal and driven through rotary members (5a, 5b, 9a, 9b or 12a, 12b, 12c, 12d) each being rotated by one of the motors (8a, 8b) in both the clockwise and the anti-clockwise directions.

1 Claim, 4 Drawing Sheets

FLEXIBLE ROBOT ARM

TECHNICAL FIELD OF THE INVENTION

The present invention relates to a flexible robot arm which comprises a plurality of elements arranged in a series so as to engage with each other at their respective contact surfaces each formed in an arched opposed single-curve and actuating devices arranged to operate between the elements adjacent to each other or to actuate the elements for generating and/or transmitting power, thereby supporting and/or manipulating a tool or the like connected to the leading end of the robot arm.

TECHNICAL BACKGROUND OF THE INVENTION

Heretofore, this kind of a flexible robot arm has been known as disclosed in Japanese Patent Publication No. Sho 59-21756 (U.S. Pat. No. 4,393,728).

The prior art flexible robot arm disclosed in the publication is provided with a plurality of disc-shaped elements each of which both the top and the bottom surfaces thereof having arched opposed double-curve are formed as contact surfaces, respectively, and at a peripheral portion of each disc-shaped element, a plurality of actuating devices (for example, four devices) each comprising a length of cable, etc., are allowed to penetrate the element at plural spots (for example, four spots) spaced apart from one another at an equal distance in the peripheral direction of the disc-shaped element. Respective leading ends of the actuating devices are independently connected to an element arranged at the most distal end, while respective base ends of the actuating devices are connected to a plurality of drive units (for example, four unit) mounted independently of one another. Each of the drive units serves as selectively drawing or loosening the actuating device interrelating to each other. Such as, for example, a drum unit allowed to bidirectionally rotate by means of a motor, a hydraulic cylinder unit allowed to extrude and retract, etc. are preferably used.

Such a prior art flexible robot arm as described above is adapted to be constructed so as to bend or move in a direction such that at least one of the actuating device is drawn.

Further, as is clearly understood from the foregoing description, in the aforesaid prior art flexible robot arm, the actuating devices are respectively actuated by the drive units mounted independently of one another. Accordingly, when a moving stroke of each actuating device is defined as L, the maximum extruding or retracting length is required at more than 2L in case, for example, of the hydraulic cylinder unit as a drive unit. Therefore, a drive unit section of the flexible robot arm where the same numbers of hydraulic cylinder units as those of actuating devices are mounted thereat requires a large space and hence becomes a remarkably heavy weight. In particular, in order to deal with works to be performed at an area where is further away and extends in wider range, there is provided such a flexible robot arm as connecting a plurality of flexible arms in a series through their respective drive units. In this flexible robot arm, the durability of itself remarkably deteriorate because of a heavy weight of each of the drive units which are respectively connected between the respective flexible arms adjacent to each other.

Further, since a space occupied by the drive section becomes large as mentioned above, the flexible robot arm must be formed in a big size. As a result, it has a further disadvantage such that the work site where the big sized flexible robot arm is used must be limited.

SUMMARY OF THE INVENTION

The present invention has been made in view of the above-mentioned circumstances in the prior art, and has for its aims to provide a flexible robot arm in which a motor for driving each of actuating devices can be made in a light weight and a small capacity, and therefore a drive section thereof can be made in a small size and a light weight.

In order to achieve the above-mentioned aim, according to a first aspect of the present invention, there is provided a flexible robot arm comprising: a plurality of disc-shaped elements arranged in a series and each of which both surfaces having an arched opposed single-curve, respectively, being served as contact surfaces; a plurality of wire-like actuating devices which penetrates the disc-shaped elements at plural spots where are positioned at a peripheral portion of each element and are spaced apart from one another at an equal distance and which are connected at their respective leading ends to the most distal end element; and a plurality of drive units mounted in a drive section and connected to respective proximal ends of the wire-like actuating devices, respectively, for selectively drawing and loosening the wire-like actuating devices to curve and bend or move a robot arm consisting the elements, the flexible robot arm being characterized in that the drive units comprises two drive units mounted in the drive section so as not to interfere with each other, each of the drive units being connected to respective proximal ends of a pair of wire-like actuating devices out of the plurality of wire-like actuating devices which are oppositely disposed on the diagonal line and being derived through a rotatable body rotated by means of a motor in the clockwise and the anti-clockwise directions.

According to a second aspect of the present invention, there is provided a flexible robot arm, characterized in that each of the drive units as described in the first aspect comprises a pair of rack members mounted movably so as to be opposite to each other and to be connected to the respective proximal ends of the pair of wire-like actuating devices, respectively, and a pinion disposed between the pair of rack members so as to engage simultaneously with both the rack members and allowed to rotate by means of a motor in the clockwise and the anti-clockwise directions.

According to a third aspect of the present invention, there is provided a flexible robot arm, characterized in that each of the drive units as described in the first aspect comprises a pulley allowed to rotate by means of a motor in the clockwise and the anti-clockwise directions, and a belt wound around the pulley so as not to cause any slip on the pulley and connected at both ends thereof to the respective proximal ends of the pair of wire-like actuating devices, respectively.

According to a fourth aspect of the present invention, there is provided a flexible robot arm, characterized in that each of the drive units as described in the first aspect comprises a pair of slidable members connected to the respective proximal ends of the pair of wire-like actuating devices, respectively, and a pair of threaded arms allowed to engage with the pair of slidable members, respectively, and to rotate through a gear train by means of a motor, wherein the pair of slidable members causes them to slide in the opposite directions to each other when the threaded arms are rotated by the motor.

The above and many other advantages, features and additional objects of the present invention will become manifest to those versed in the art upon making reference to the following detailed description and accompanying drawings in which preferred structural embodiments incorporating the principles of the present invention are shown by way of illustrative example.

DETAILED DESCRIPTION OF PREFERRED EMBODIMENTS

Hereinafter, the present invention is explained in more detail with reference to the accompanying drawings.

Figure 1:
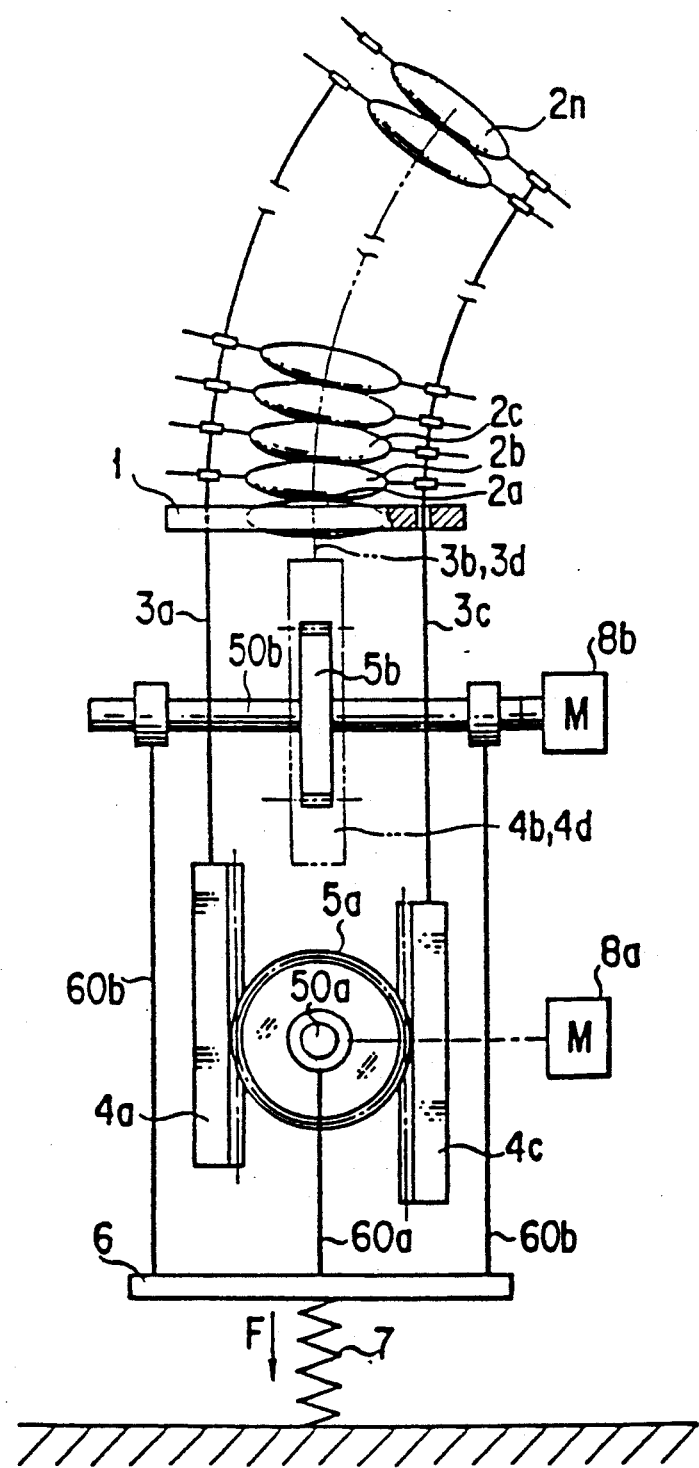
FIG. 1 is an explanatory view showing the structure of the principal part in a first embodiment as a flexible robot arm of the present invention.

In the first place, a first embodiment of the present invention is explained with relation to FIG. 1.

In FIG. 1, reference numeral 1 represents a base plate fixedly secured to a framework, not shown, of the embodiment. On the base plate 1, a plurality of disc-shaped elements $2a$, $2b$, $2c$, ... $2n$ each being formed with convex contact surfaces at both the top and the bottom surfaces thereof are pilled in a series. In four spots positioned at a peripheral portion of each element and spaced at an equal distance in the peripheral direction of each element apart from one another, actuating devices consisting of wires $3a$, $3b$, $3c$ and $3d$ are respectively penetrated, in turn, in the clockwise or the anti-clockwise direction. Further, respective leading ends of the wires are connected to the element $2n$ disposed at the most distal end portion. The respective proximal ends of the actuating devices $3a$ to $3d$ are connected to rack members $4a$, $4b$, $4c$ and $4d$, respectively, forming two pairs of drive units after penetrating the base plate 1. Out of these rack members $4a$ to $4d$, respective two pairs thereof $4a$, $4c$ and $4b$, $4d$ connected two pairs of actuating devices $3a$, $3c$ and $3b$, $3d$, respectively, in which each pair of actuating devices are positioned oppositely to each other on the diagonal line, are disposed oppositely to each other and shifted in position to each other in the longitudinal direction thereof so as not to cause any interference with each other. In addition, pinions $5a$, $5b$ are mounted so as to engage with the rack members of the respective pairs thereof, respectively. These pinions $5a$, $5b$ are adapted to shift their respective phases at 90 degrees to each other with respect to the directions of their respective faces, and further each of the pinions is subjected to a reference tensioning force F by a loading member 7 such as, for example, a compression spring through a support member $60a$ or $60b$ and an intermediate plate member 6 bearing the support member $60a$ or $60b$. A hydraulic cylinder unit is preferably used also as the loading member 7.

To their respective rotary shafts $50a$, $50b$ of the pinion $5a$, $5b$ is connected motors $8a$, $8b$, respectively.

Further, the rack members $4a$ to $4d$ are slidably supported to guide members, not shown, respectively.

In such a first embodiment as constructed above, all of the four actuating devices $3a$ to $3d$ are subjected to the action of even reference tensioning force by means of the loading member 7. Thus, a flexible arm of this first embodiment consisting of the plurality of disc-shaped elements $2a$, $2b$, $2c$, ... $2n$ has such an attitude as extending at right angles to the base plate 1.

Under the condition, when one of the pinions $5a$ is rotated in the clockwise direction by means of the motor $8a$, one rack member $4a$ of the pair of rack members $4a$, $4c$ allowed to engage with the pinion $5a$ is moved upwards, while another rack member $4c$ is moved downwards. As a result, a tension acted on the actuating device $3a$ connected to the upwardly moved rack member $4a$ is reduced less than the reference tensioning force, while that acted on the actuating device $3c$ connected to the downwardly moved rack member $4c$ is increased more than the reference tensioning force. Accordingly, the flexible arm is subjected to such a deformation as curved or bent in the direction where the tension is increased as shown in FIG. 1.

At that time, a force by which the actuating device $3a$ is loosened and the other force by which the actuating device $3c$ is drawn are equal to each other, but their respective operating directions are different from each other. Further, at that time, the motor $8a$ driving the pinion $5a$ is permitted to output such a force as required to curve or bend the flexible arm by the action of the two actuating devices $3a$, $3c$, because the reference tensioning force is added by the loading member 7.

On the other hand, by the operation in a similar manner as described above, the flexible arm is subjected to the deformation as curved or bent on the different direction according to a degree of rotating angle of the pinion $5b$ when the other pinion $5b$ is rotated by means of the other motor $8b$.

And furthermore, the flexible arm can be curved or bent in a desired direction by allowing both the motors $8a$, $8b$ to control their respective rotations simultaneously with each other.

Figure 2:
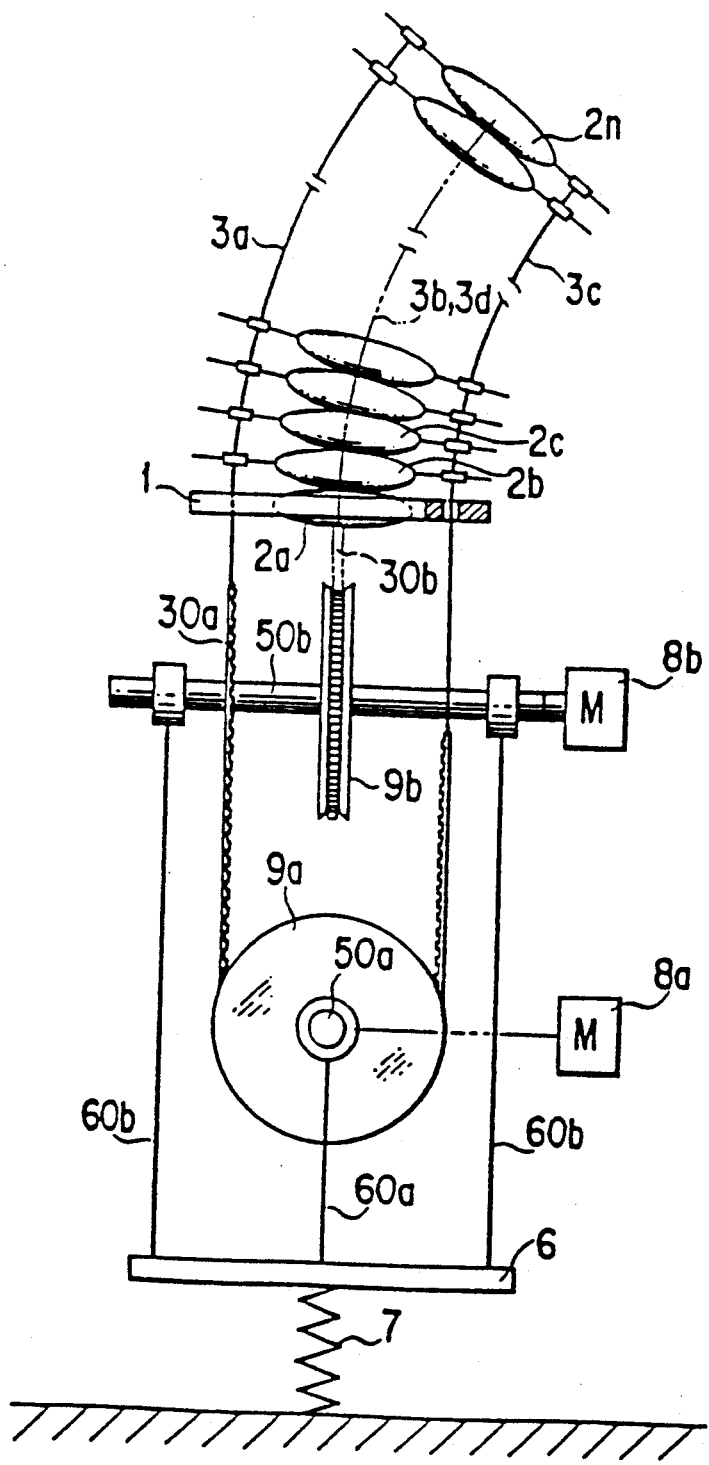
FIG. 2 is an explanatory view showing the structure of the principal part in a second embodiment as a flexible robot arm of the present invention.

In the next place, a second embodiment of the present invention is explained in relation to FIG. 2. Hereupon, in FIG. 2, construction parts represented by the same reference numerals and the same reference symbols as those shown in FIG. 1 are free from explaining because they are the same parts and have the same operating functions as those in the first embodiment.

In FIG. 2, two pairs of drive units for driving two pairs of actuating devices $3a$, $3c$ and $3b$, $3d$, respectively, comprises two pulleys $9a$, $9b$ disposed under the base plate 1 in such a positioning relationship as spaced apart from each other in the vertical direction, and connecting members $30a$ and $30b$ such as, for example, belts wound around the pulleys $9a$, $9b$, respectively, so as not to cause any slippage. The pulleys $9a$, $9b$ are so mounted as to be rotatable by means of motors $8a$, $8b$ in the clockwise direction and the anti-clockwise direction, while respective both ends of the belts $30a$, $30b$ are connected to the respective proximal ends of the actuating devices $3a$, $3c$, respectively.

Thus, when the pulley $9a$ and/or the pulley $9b$ are/is caused to rotate in the clockwise or the anti-clockwise direction, the actuating device $3a$ or $3c$ and/or the other actuating device $3b$ or $3d$ are/is drawn or loosened so as to curve or bend the flexible arm in a desired direction.

In addition, hereinafter, a third embodiment of the present invention is explained with reference to FIGS. 3A and 3B. Hereupon, in FIGS. 3A and 3B, as is similar to the case of the above-described second embodiment, construction parts represented by the same reference numerals and the same reference symbols as those shown in FIG. 1 are free from explaining because they are the same parts and have the same operating functions as those in the first embodiment.

Figure 3A:
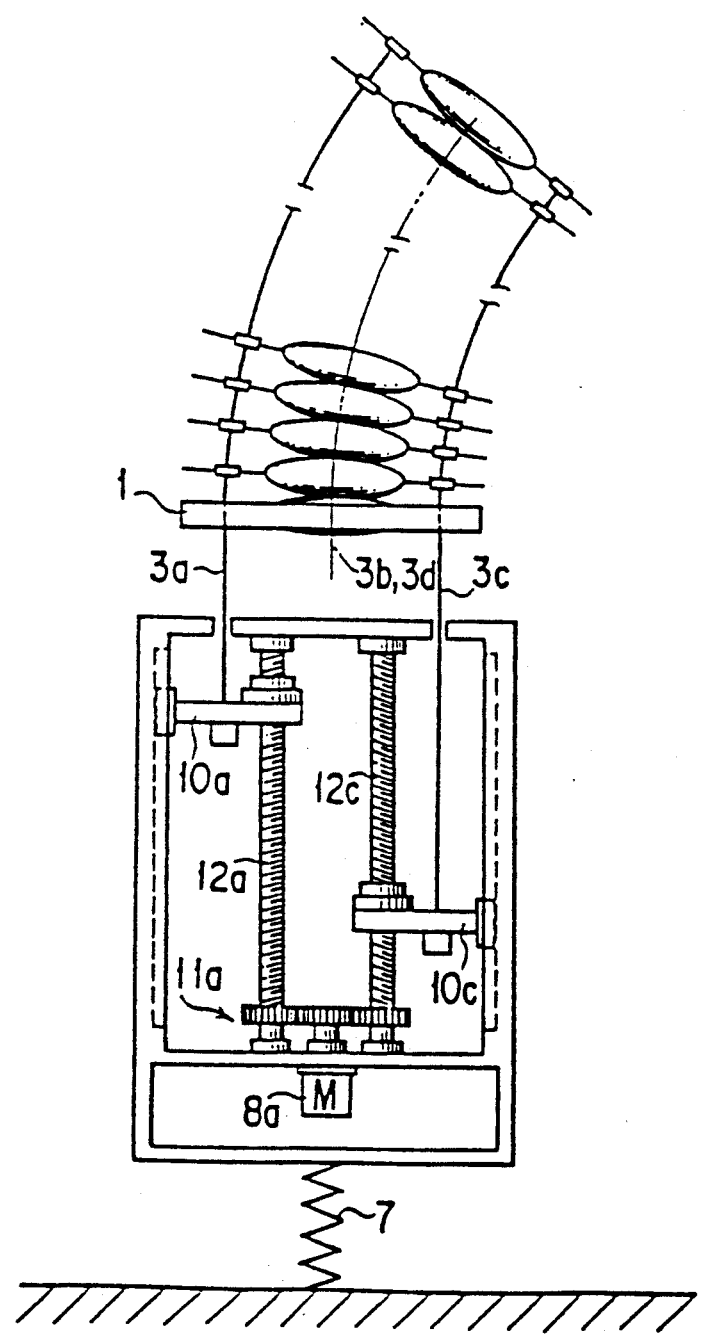
FIGS. 3A and 3B are explanatory views showing structures of the principal parts in a third embodiments of the present invention as a flexible robot arm.

As is clear from FIG. 3A, respective proximal ends of a pair of actuating devices 3a, 3c are fixedly connected to slidable members 10a, 10c, respectively, which are beared to a framework of a flexible robot arm in the third embodiment so as to be allowed to be slidable in the vertical direction. These slidable members 10a, 10c are permitted to engage by the interposition of a gear train 11a with two threaded arms 12a, 12c, respectively, upstanding vertically and rotatably by means of a motor 8a. In the third embodiment shown in FIG. 3A, the two threaded arms 12a, 12b are allowed to rotate by the motor 8a in the same direction simultaneously with each other because of the interposition of the gear train 11a. Accordingly, in order to cause the sliding members 10a, 10c to slidingly move in the opposite directions to each other so as to draw either one of the actuating devices 3a, 3c and, on the other hand, to loosen the other actuating device, it is necessary to form either one of threads of the threaded arms 12a, 12b into a reversed thread.

However, it is not shown in the drawings, in case of forming their respective threads of both the threaded arms 12a, 12b into the identical thread with each other, a power transmitting section such as, for example, the gear train may be constructed such that rotation from the motor 8a is transmitted so as to rotate either one of the threaded arms reversely to the other threaded arm.

Figure 3B:
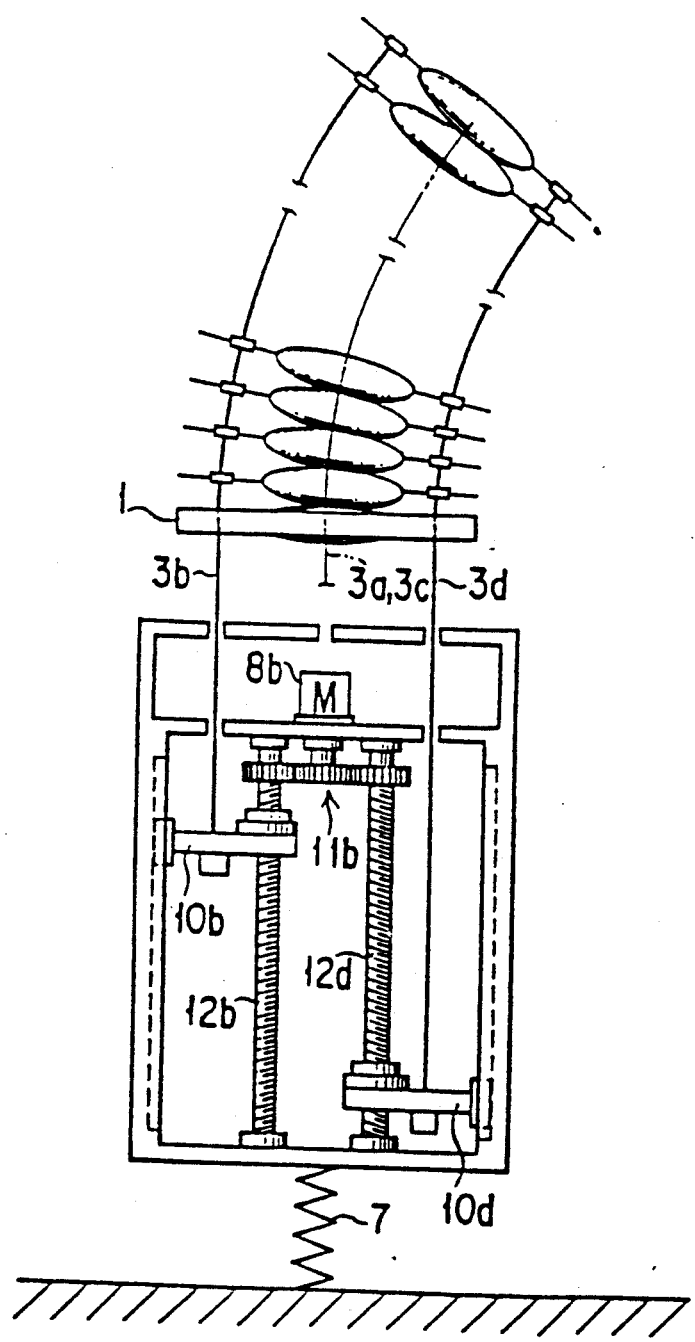

FIG. 3A and 3B shows another drive unit for driving another pair of the actuating devices 3b, 3c. This drive unit has the same structure and the same operating function as those in the drive unit shown in FIG. 3A. Therefore, the explanation thereof is omitted.

Hereupon, in FIGS. 3A and 3B, it is a matter of course that the above-described pairs of slidable members 10a, 10c and 10b, 10c are mounted independently of one another so as not to cause any interference with one another upon their respective sliding movements.

While the invention has been particularly shown and described in reference to preferred embodiments thereof, it will be understood by those skilled in the art that changes in form and details may be made therein without departing from the spirit and scope of the invention.

What is claimed is:

1. A flexible robot arm comprising:
   a plurality of disc-shaped elements arranged in a series and each of which both surfaces having an arched opposed single-curve, respectively, being served as contact surfaces;
   a plurality of wire-like actuating devices which penetrate said disc-shaped elements at locations positioned at a peripheral portion of each element and spaced apart from one another at a substantially equal distance, said plurality of wire-like actuating devices being connected at their respective leading ends to the most distal end element; and
   a plurality of driving means mounted in a drive section and connected to respective proximal ends of said wire-like actuating devices, respectively, for selectively drawing and loosening said wire-like actuating devices to curve and bend or move a robot arm having the elements, wherein said driving means comprises two drive units mounted in the drive section so as avoid interference with each other, each of said driving means being connected to respective proximal ends of a pair of wire-like actuating devices out of said plurality of wire-like actuating device which are oppositely disposed on the diagonal line and being driven through a rotatable body rotated by means of a motor in the clockwise and the counter-clockwise directions, wherein each of said driving means comprises a pair of rack members mounted movably so as to be opposite to each other and to be directly connected to the respective proximal ends of said pair of wire-like actuating devices, respectively, and a pinion disposed between said pair of rack members so as to engage simultaneously with both the rack members and allowed to rotate by means of a motor in the clockwise and the counter-clockwise directions.

* * * * *